US012585607B2

(12) United States Patent
Lu et al.

(10) Patent No.: US 12,585,607 B2
(45) Date of Patent: Mar. 24, 2026

(54) BUS MODULE AND SERVER

(71) Applicant: Suzhou MetaBrain Intelligent Technology Co., Ltd., Suzhou (CN)

(72) Inventors: Jigui Lu, Suzhou (CN); Jingxian Zhu, Suzhou (CN)

(73) Assignee: Suzhou metaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/116,303

(22) PCT Filed: Sep. 23, 2024

(86) PCT No.: PCT/CN2024/120421
§ 371 (c)(1),
(2) Date: Mar. 27, 2025

(87) PCT Pub. No.: WO2025/082147
PCT Pub. Date: Apr. 24, 2025

(65) Prior Publication Data
US 2025/0265212 A1     Aug. 21, 2025

(30) Foreign Application Priority Data

Oct. 17, 2023    (CN) ......................... 202311340081.5

(51) Int. Cl.
H05K 7/10     (2006.01)
G06F 13/40     (2006.01)
G06F 13/42     (2006.01)

(52) U.S. Cl.
CPC ...... G06F 13/4068 (2013.01); G06F 13/4022 (2013.01); G06F 13/409 (2013.01); G06F 13/4221 (2013.01); G06F 2213/0026 (2013.01)

(58) Field of Classification Search
CPC ............. G06F 13/4068; G06F 13/4022; G06F 13/409; G06F 13/4221; G06F 2213/0026
See application file for complete search history.

(56) References Cited

U.S. PATENT DOCUMENTS 6,490,153 B1     12/2002  Casebolt et al.
7,275,941 B1 *  10/2007  Bushby .............. H01R 13/6397
                                              439/133
(Continued)

FOREIGN PATENT DOCUMENTS

CN     111857246 A     10/2020
CN     114302611 A     4/2022
(Continued)

OTHER PUBLICATIONS

International Search Report of corresponding PCT application (PCT/CN2024/120421), mailed Dec. 31, 2024, 6 pages.
(Continued)

*Primary Examiner* — Henry Tsai
*Assistant Examiner* — Kim T Huynh
(74) *Attorney, Agent, or Firm* — Cooper Legal Group, LLC

(57) ABSTRACT

A bus module and a server are disclosed. The bus module includes: a housing, where a second connector is connected to a first end of the housing for plugging into a first connector; a bus network interface card, including a card body and a blocking piece, where a first bending portion extending in a direction away from the network interface card body is formed at one end of the blocking piece, and a first shielding portion arranged around the first bending portion is formed on the housing; and a lever structure, including a hinge end, an operating end, and a second bending portion, where the hinge end is hinged to one side away from the first bending portion of the second end, the second bending portion is connected to the operating end, and the second bending portion is configured to contact and detachably connect the first shielding portion.

18 Claims, 9 Drawing Sheets

(56)                    References Cited

U.S. PATENT DOCUMENTS

| | | | | |
|---|---|---|---|---|
| 8,107,256 B1 * | 1/2012 | Kondrat | .............. | H05K 7/1429 |
| | | | | 361/796 |
| 2013/0157478 A1 * | 6/2013 | Naufel | .............. | H01R 12/7082 |
| | | | | 439/59 |
| 2022/0312621 A1 | 9/2022 | Chang et al. | | |

FOREIGN PATENT DOCUMENTS

| | | | |
|---|---|---|---|
| CN | 115129124 | A | 9/2022 |
| CN | 219018045 | U | 5/2023 |
| CN | 116449923 | A | 7/2023 |
| CN | 117093527 | A | 11/2023 |

OTHER PUBLICATIONS

Written Opinion of International Searching Authority of corresponding PCT application (PCT/CN2024/120421), mailed Dec. 31, 2024, 11 pages.
Notification to Grant Patent Right for Invention of corresponding CN priority application (CN202311340081.5), mailed Dec. 5, 2023, 3 pages.

* cited by examiner

BUS MODULE AND SERVER

CROSS-REFERENCE TO RELATED APPLICATIONS

The present application claims priority to Chinese Patent Application No. 2023113400815 filed with the China National Intellectual Property Administration on Oct. 17, 2023 and entitled "BUS MODULE AND SERVER", which is incorporated herein by reference in its entirety.

FIELD

The present application relates to a bus module and a server.

BACKGROUND

A bus module is a peripheral component interconnect express (PCIe) module, which is internally provided with a PCIe card. PCIe is a high-speed serial computer expansion bus standard, and a PCIe card is a standard card in a server industry.

In a related art, a slot for a bus module to plug in is formed in a case. A first connector is arranged in the slot. The bus module includes a housing, a bus network interface card arranged in the housing, and a second connector connected to the bus network interface card. The first connector is configured to be plugged with the second connector. However, a blocking piece of the bus network interface card is L-shaped and needs to occupy a relatively large space in the housing, thereby increasing an overall size of the bus module. Both the first connector and the second connector are high-density connectors, resulting in that a relatively high plugging and unplugging force is required for disassembling and assembling the bus module, disassembling and assembling processes are laborious, and labor intensity of an operator is improved.

SUMMARY

According to an embodiment disclosed in the present application, in a first aspect, a bus module is provided. The bus module is configured to be plugged into a slot of a case, and a first connector is arranged in the slot. The bus module includes:

a housing, having a first end and a second end;

a second connector, connected to a first end of the housing, and configured to be plugged with the first connector;

a bus network interface card, arranged in the housing, where the bus network interface card includes a network interface card body and a blocking piece, the blocking piece is connected to one end away from the second connector of the network interface card body, a first bending portion is formed at one end of the blocking piece, the first bending portion extends in a direction away from the network interface card body, and a first shielding portion arranged around the first bending portion is formed at a position corresponding to the first bending portion of the housing; and a lever structure, including a hinge end, an operating end, and a second bending portion, where the hinge end is hinged to one side away from the first bending portion of the second end, the second bending portion is connected to the operating end, the second bending portion is configured to be in contact with the first shielding portion and is detachably connected to the first shielding portion, and the lever structure is configured to assist in plugging or unplugging of the second connector and the first connector.

According to an embodiment disclosed in the present application, in a first aspect, a server is further provided, including:

a case, where a slot is formed in one side of the case; and a bus module involved in the first aspect of the present application, where the bus module is configured to be plugged into the slot.

Details of one or more embodiments of the present application are provided in accompanying drawings and descriptions below. Other features and advantages of the present application will become apparent from the specification, the accompanying drawings, and the claims.

BRIEF DESCRIPTION OF THE DRAWINGS

To describe technical solutions in implementations of the present application or in a related art more clearly, the following briefly introduces accompanying drawings for describing the implementations or the related art. Apparently, the accompanying drawings in the following description show some implementations of the present application, and a person of ordinary skill in the art may still obtain other accompanying drawings from the accompanying drawings without creative efforts.

DETAILED DESCRIPTION

Figure 1:
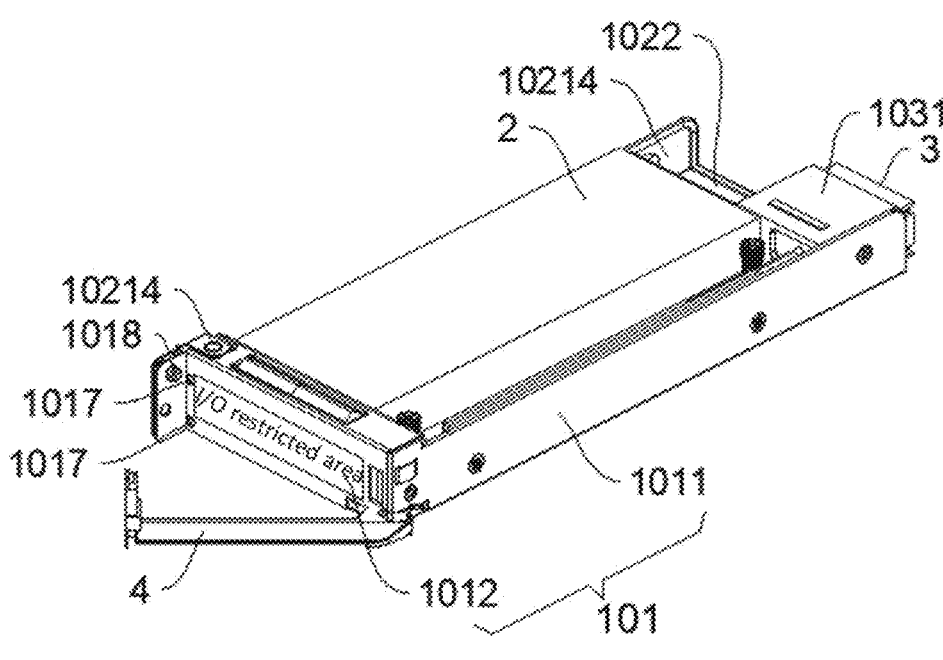
FIG. 1 is a three-dimensional diagram of a bus module according to an embodiment of the present application.

To make the objectives, technical solutions, and advantages of embodiments of the present application clearer, the following clearly and completely describes the technical solutions in the embodiments of the present application with reference to the accompanying drawings in the embodiments of the present application. Apparently, the described embodiments are part rather than all of the embodiments of the present application. Based on the embodiments in the present application, all other embodiments obtained by those skilled in the art without creative work fall within the scope of protection of the present application.

Hot plugging, that is, hot swap, refers to that a module and an expansion card are plugged in or unplugged from a system without affecting normal work of the system in a case of not shutting down a power supply, which can improve reliability, rapid maintainability, redundancy, capability to recover disasters in time, and the like of the system. A bus module is generally connected to an interior of a case by bolts. An operator needs to open an upper cover of the case, and then installs the bus module in the case. This installation manner is complex, and the module cannot be assembled and disassembled in a case of not shutting down a system power supply. To facilitate assembly, disassembly, and maintenance of the bus module, the bus module needs to be configured to be hot pluggable.

To facilitate plug-in maintenance of the bus module, in a related art, a first connector is also arranged at a slot of the case, and a second connector is arranged on the bus module. The first connector can be plugged with the second connector. However, in such a bus module, a hole position in a blocking piece of the bus module is in an idle state, the blocking piece on a bus network interface card is L-shaped, so that the blocking piece needs to occupy a relatively large space in a housing, thereby increasing an overall size of the bus module.

To save space, the blocking piece needs to be removed, and a new blocking piece needs to be customized. However, an original manufacturer of the bus network interface card is not maintained any longer due to the removal of the blocking piece, which brings inconvenience to a customer. To customize the new blocking piece, a system factory needs to newly develop spare parts for fixing screws of the blocking piece, which will increase the cost of the bus module.

In addition, both the first connector and the second connector are high-density connectors, which results in great plugging and unplugging resistance of the first connector and the second connector. To facilitate force application of an operator, a handle is generally arranged on a housing 1 of the bus module. When the bus module is plugged into a slot 701 of a case 7, the handle is located at a notch of the slot 701, and the operator can apply a force to the bus module through the handle. However, the operator needs to apply a relatively great force to complete plugging and unplugging operations of the bus module through such a handle. In addition, the handle is located at the notch, so that a relatively large space in the slot 701 needs to be occupied. Embodiments of the present application are described with reference to FIG. 1 to FIG. 18.

According to an embodiment of the present application, in a first aspect, a bus module is provided. The bus module is configured to be plugged into a slot 701 of a case 7, and a first connector 702 is arranged in the slot 701. The bus module includes a housing 1, a bus network interface card 2, a second connector 3, and a lever structure 4. The housing 1 has a first end and a second end. The second connector 3 is connected to the first end of the housing 1, and is configured to be plugged with the first connector 702. The bus network interface card 2 is arranged in the housing 1, and the bus network interface card 2 includes a network interface card body 201 and a blocking piece 202. The blocking piece 202 is connected to one end of the network interface card body 201 away from the second connector 3. A first bending portion 2021 is formed at one end of the blocking piece 202. The first bending portion 2021 extends in a direction away from the network interface card body 201. A first shielding portion arranged around the first bending portion 2021 is formed at a position corresponding to the first bending portion 2021 of the housing 1. The lever structure 4 includes a hinge end, an operating end, and a second bending portion 4014. The hinge end is hinged to one side away from the first bending portion 2021 of the second end. The second bending portion 4014 is connected to the operating end. The second bending portion 4014 is configured to be in contact with the first shielding portion and is detachably connected to the first shielding portion, and the lever structure 4 is configured to assist in plugging or unplugging of the second connector 3 and the first connector 702.

According to the bus module of this embodiment, a lever structure 4 is arranged at the second end of the housing 1. An operator can separate the operating end of the lever structure 4 from the second end of the housing 1 first, then hold the operating end of the lever structure 4, and applies a force through the operating end to assist in plugging or unplugging the second connector 3 and the first connector 702, so that a plugging and unplugging force required for assembling and disassembling the bus module can be reduced, assembling and disassembling processes are laborious, and labor intensity of the operator is improved.

In addition, the bus module in this embodiment remains the original blocking piece 202 of the bus network interface card 2, and the housing 1 is configured to include the first shielding portion arranged around the first bending portion 2021. The second bending portion 4014 of the lever structure 4 is detachably connected to the first shielding portion. Through such an arrangement, the first shielding portion is configured to be connected to the lever structure 4, and one side of the bus network interface card 2 away from the second connector 3 is configured to accommodate the lever structure 4, so that space of this part of the first bending portion 2021 is fully used, a structure of the bus module is more compact, and reducing of an overall size is facilitated. The bus module of this embodiment cannot occupy too much space while remaining the blocking piece 202 of the bus network interface card 2, so that the costs are low, and the structure is compact.

Therefore, the bus module of this embodiment can overcome defects that a relatively high plugging and unplugging force is required for disassembling and assembling the bus module, the disassembling and assembling processes are laborious, and labor intensity of the operator is improved, and cannot occupy too much space while remaining the blocking piece 202 of the bus network interface card 2, so that the costs are low, and the structure is compact.

Preferably, both the first connector 702 and the second connector 3 are high-density connectors.

Figure 2:
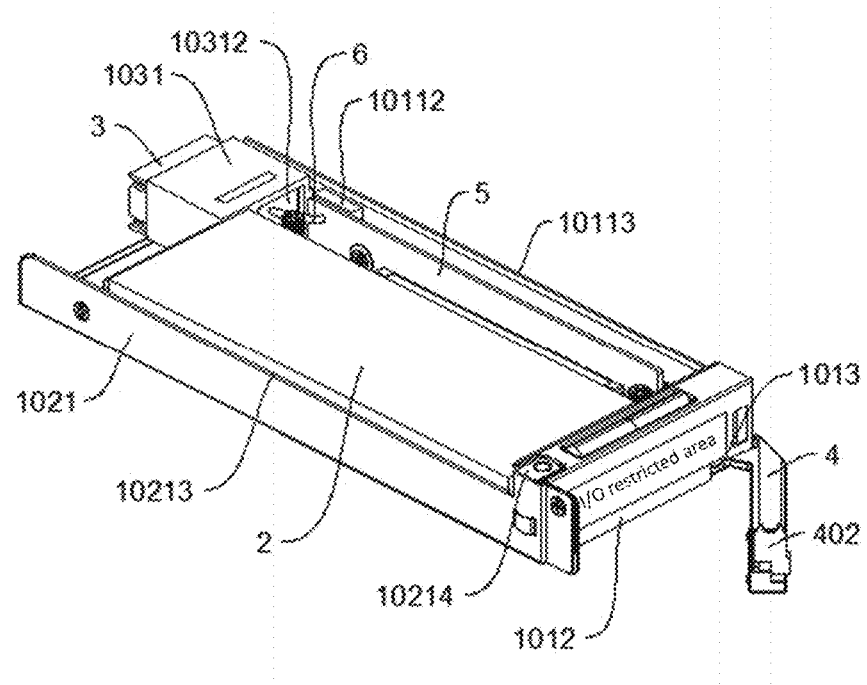
FIG. 2 is a three-dimensional diagram of a bus module according to an embodiment of the present application from another perspective.

In one or more embodiments, as shown in FIG. 2, a first abutting protrusion 4011 is connected at the hinge end. The first abutting protrusion 4011 is in contact with the notch of the slot 701. When the operator applies a force to the operating end of the lever structure 4 to force the operating end to rotate in a direction away from the housing 1, the hinge end of the lever structure 4 can rotate reversely, so that the first abutting protrusion 4011 applies a pressure to the notch of the slot 701 to enable the bus module to be falling off from the slot 701 under a counter-acting force at the notch.

As a variable implementation, a protruding contact portion is formed on a side wall of the slot 701, and the first abutting protrusion 4011 is in contact with the contact portion.

Figure 3:
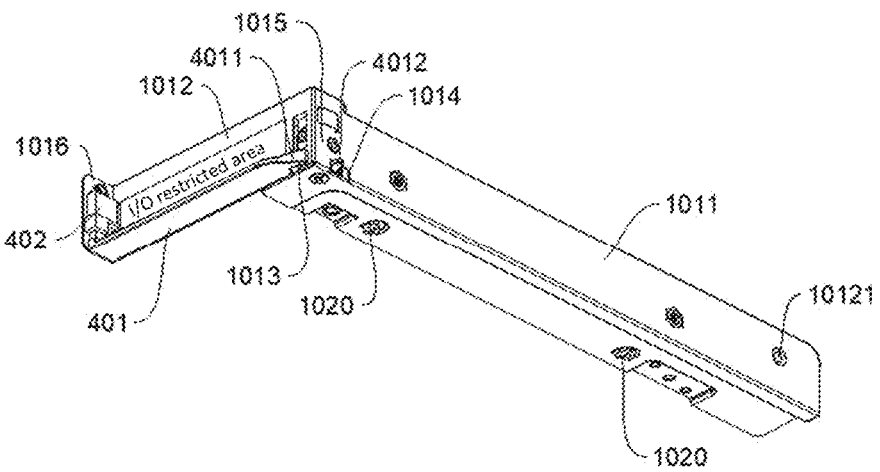
FIG. 3 is a first bracket of a bus module according to an embodiment of the present application.
Figure 4:
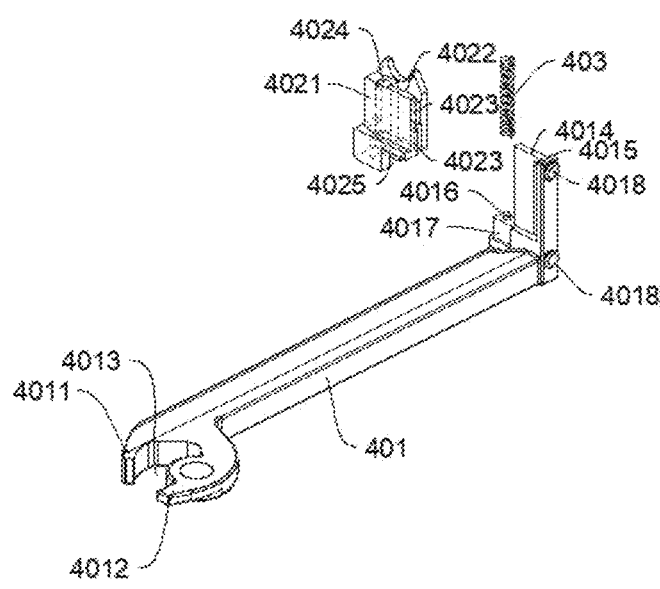
FIG. 4 is an exploded view of a lever structure of a bus module according to an embodiment of the present application.

In one or more embodiments, as shown in FIG. 3 and FIG. 4, the hinge end includes a second abutting protrusion 4012, and a contact slot 703 is formed in a slot wall of the slot 701. The second abutting protrusion 4012 is in contact with a side wall of one side of the contact slot 703 away from the second connector 3 when the second bending portion 4014 is connected to the first shielding portion. The second abutting protrusion 4012 is configured to be separated from the contact slot 703 when the lever structure 4 rotates in a direction away from the housing 1.

Through such an arrangement, when the bus module needs to be plugged into the slot 701, the operator can plug the bus module into the slot 701 first, and then the operating end is driven to rotate in a direction close to the housing 1, so that cooperation between the second abutting protrusion 4012 and the contact slot 703 assists in a connection between the second connector 3 and the first connector 702. The second abutting protrusion 4012 can be constrained within the contact slot 703 after the second bending portion 4014 is connected to the first shielding portion, so as to prevent the bus module from sliding in a plugging direction of the bus module and the slot 701, thereby preventing the bus module from falling off from the slot 701 under an external acting force or due to an error operation.

When the bus module needs to be unplugged from the slot 701, the operator can release the connection between the second bending portion 4014 and the first shielding portion, so that the operating end rotates in a direction away from the housing 1, and the second abutting protrusion 4012 can be separated from the contact slot 703 to allow the bus module to be unplugged from the slot 701.

In one or more embodiments, a connecting port is formed in one side of the second end hinged to the lever structure 4. The hinge end penetrates through the connecting port and is hinged to an interior of the housing 1. The second abutting protrusion 4012 penetrates through the connecting port and is plugged into the contact slot 703 when the second bending portion 4014 is connected to the first shielding portion. Through such an arrangement, a hinge point between the lever structure 4 and the housing 1 can be located in the housing 1, which helps to enhance attractiveness of the bus module, and prevent a pollutant from being in contact with a hinge shaft to lead to unsmooth rotation of a lever. The second abutting protrusion 4012 can be located in the housing 1 when a user plugs the bus module into the slot 701, so that a gap does not need to be formed between the bus module and the slot 701 to accommodate the second abutting protrusion 4012, and a structure of the case is more compact.

Figure 5:
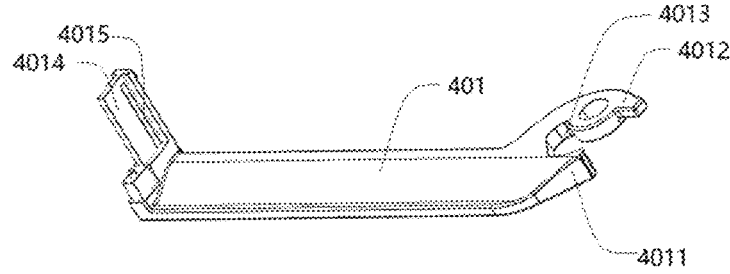
FIG. 5 is a lever main body of the lever structure shown in FIG. 5.

In one or more embodiments, as shown in FIG. 5, the connecting port includes a first connecting port 1013 and a second connecting port 1014. The first connecting port 1013 and the second connecting port 1014 are respectively formed in two adjacent side walls of the second end. A connecting portion 1015 is formed between the first connecting port

1013 and the second connecting port 1014. An avoidance opening 4013 is formed between the first abutting protrusion 4011 and the second abutting protrusion 4012, and the connecting portion 1015 penetrates through the avoidance opening 4013. The avoidance opening 4013 can prevent the lever structure 4 from interfering with the connecting portion 1015 of the housing 1 during rotating.

In one or more embodiments, as shown in FIG. 4 to FIG. 7, the lever structure 4 includes a lever main body 401, a locking structure 402, and an elastic piece 403. The lever main body 401 has a hinge end, an operating end, and a second bending portion. The locking structure 402 is movably connected to the second bending portion 4014. The locking structure 402 has a locking position locked and connected to the second end and an unlocking position separated from the second end of the housing 1. The elastic piece 403 is connected between the locking structure 402 and the second bending portion 4014.

The locking structure 402 can be constrained at the locking position under support of the elastic piece 403 when the bus module is plugged into the slot 701, and the second abutting protrusion is constrained within a contact slot. An operator can apply a pressure to the locking structure 402 and compress the elastic piece 403 when the bus module needs to be unplugged, so that the locking structure 402 is switched to the unlocking position, then the operating end rotates in a direction away from the housing 1, and the lever structure 4 assists in unplugging of the bus module.

Optionally, the lever main body 401 is a rod-like structure. Preferably, in this embodiment, the lever main body 401 is of a wrench structure hinged to the housing 1.

As a variable implementation, optionally, the lever structure 4 includes a locking knob. The locking knob is rotatably connected to the operating end of the lever structure 4. A handle portion is arranged at one end, and a limiting strip is arranged the other end. A strip-shaped hole matching the limiting strip is formed in the housing 1.

As another variable implementation, an elastic buckle is arranged on the operating end of the lever structure 4. A clamping slot that can be clamped with the elastic buckle is correspondingly formed in the housing 1.

In one or more embodiments, a sprouting structure 1018 is protruded from the first shielding portion. A locking gap configured to be locked and connected to the sprouting structure 1018 is formed in the locking structure 402. Through such an arrangement, the sprouting structure 1018 of the first shielding portion can serve as a connecting structure to detachably connected to the locking structure 402 of the lever structure 4, and a connecting structure does not need to be added to the first shielding portion, so that a quantity of components required by the bus module can be reduced, and the structure of the bus module is more concise.

In one or more embodiments, the locking structure 402 includes a locking sleeve 4021 and a plug-in port 4022. The locking sleeve 4021 is provided with a locking gap. The plug-in port 4022 is formed in the locking sleeve 4021. An edge that faces the bus network interface card 2 is defined as a first edge when the locking structure 402 is locked and connected to the sprouting structure 1018, the plug-in port 4022 is formed at the first edge, and the second bending portion 4014 is configured to extend into the plug-in port 4022. Through such an arrangement, a connecting direction between the locking sleeve 4021 and the second bending portion 4014 can be perpendicular to a moving direction of the elastic structure, which can prevent the locking structure 402 from releasing a connection with the second bending portion 4014 under support of the elastic piece 403.

Preferably, a locking plate is arranged at a top of the locking sleeve 4021. The locking gap is formed in the locking plate. The locking plate forms a guide inclined surface at the first edge. The guide inclined surface is inclined downward in a plugging direction of the locking sleeve 4021 and the second bending portion 4014. When the bus module needs to be locked into the slot 701 of the case 7, the operator can rotate the lever structure 4 to a direction close to the housing 1, so that the guide inclined surface is in contact with the sprouting structure 1018. The guide inclined surface can guide the locking sleeve 4021 to move downward, so that the sprouting structure 1018 is allowed to enter the locking gap, and the sprouting structure 1018 and the locking sleeve 4021 are interlocked.

The locking gap is preferably, but not limited to, a semicircular gap, a square gap, a triangular gap, and the like, and is preferably a semicircular gap that accommodate a periphery of the sprouting structure 1018 in a matched manner.

In one or more embodiments, the locking sleeve 4021 is connected to the second bending portion 4014 through a guide structure, and the guide structure is configured to guide the locking sleeve 4021 to slide in a deformation direction of the elastic piece 403. The guide structure is configured to constrain a movement trajectory of the locking sleeve 4021, so that an operating process of the locking structure 402 is more stable.

Figure 6:
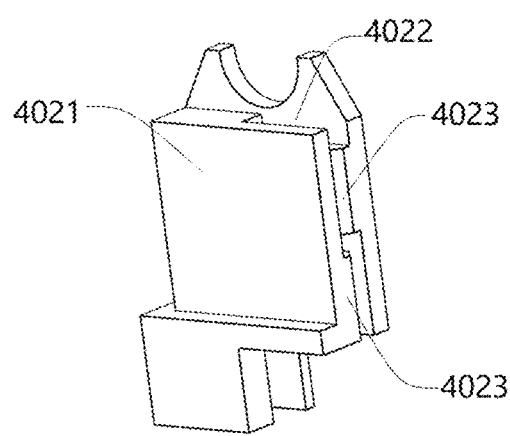
FIG. 6 is a locking structure of the lever structure shown in FIG. 5.
Figure 7:
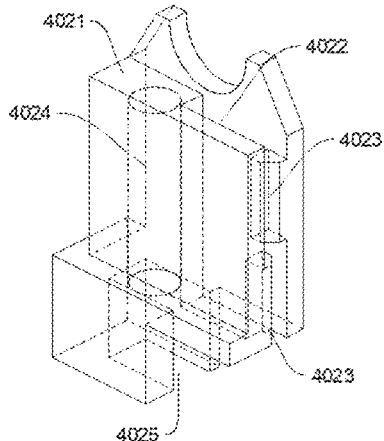
FIG. 7 is a locking structure of the lever structure shown in FIG. 5, and a dotted portion in the figure is an internal structure of the locking structure.

In one or more embodiments, as shown in FIG. 6 and FIG. 7, the guide structure includes a chute 4015 and an elastic snap hook 4023. The chute 4015 is formed in the second bending portion 4014. The elastic snap hooks 4023 are formed on the locking sleeve 4021 and are located on two sides of the plug-in port 4022. The elastic snap hooks 4023 are configured to extend into the chute 4015 and slide along the chute 4015. Through such an arrangement, the elastic snap hook 4023 can slide along the chute 4015 to guide and can hook a side wall of the chute 4015, so as to prevent the locking sleeve 4021 from falling off from the second bending portion 4014.

Preferably, the elastic snap hook 4023 includes a clamping surface and a guide inclined surface that are sequentially connected in a direction in which the elastic snap hook 4023 is clamped into the chute 4015. The clamping surface is parallel to the side wall of the chute 4015, and can be in contact with the side wall of the chute 4015 after the elastic snap hook 4023 is clamped into the chute 4015. The guide inclined surface is inclined toward a direction close to the side wall of the plug-in port 4022 in the direction in which the elastic snap hook 4023 is clamped into the chute 4015. Through such an arrangement, the guide inclined surface can guide side walls of two sides of the plug-in port 4022 to be separated from each other when in contact with the second bending portion 4014, so that the second bending portion 4014 is allowed to enter the locking sleeve 4021.

Preferably, there are a plurality of elastic snap hooks 4023. In a deformation direction of the elastic piece 403, the plurality of elastic snap hooks 4023 are arranged on groove walls of the two sides of the plug-in port 4022, so that a contact surface between the locking sleeve 4021 and the second bending portion 4014 is stressed more uniformly, and the locking sleeve 4021 slides more smoothly.

In one or more embodiments, two ends of the elastic snap hook 4023 are respectively configured to be in contact with corresponding chute walls of the chute 4015. Through such an arrangement, an upper wall of the elastic snap hook 4023 can be in contact with the chute wall of the chute 4015 when the locking sleeve 4021 moves upward with jacking of the elastic piece 403, and the locking sleeve 4021 is prevented from falling off from an upper part of the second bending portion 4014 due to the jacking of the elastic snap hook 4023.

In one or more embodiments, the elastic piece 403 is a spring, and the locking structure 402 further includes an accommodating blind hole 4024. The accommodating blind hole 4024 is formed in the locking sleeve 4021. The accommodating blind hole 4024 is located on one side of the locking sleeve 4021 away from the plug-in port 4022. A limiting stud 4016 is arranged on the second bending portion 4014. The limiting stud 4016 is arranged in the accommodating blind hole 4024 in a sliding manner. One end of the spring is sleeved over the limiting stud 4016, and the other end is in contact with a hole wall of the accommodating blind hole 4024. Through such an arrangement, the elastic piece 403 can be constrained within the locking sleeve 4021, so as to prevent the elastic piece from falling off due to exposure of the elastic piece 403 or interfering with another structure.

In one or more embodiments, a step portion 4017 is formed on the second bending portion 4014, the limiting stud 4016 is arranged on the step portion 4017, and cross-sectional area of the step portion 4017 is greater than cross-sectional area of the limiting stud 4016; and the locking sleeve 4021 further includes an accommodating cavity 4025. The accommodating blind hole 4025 is connected a lower part of the accommodating blind hole 4024, and is communicated with the plug-in port 4022. The accommodating cavity 4025 is configured to accommodate the step portion 4017. The accommodating cavity 4025 can accommodate the step portion 4017 to match the step portion 4017 to shield the elastic piece 403, thereby preventing the elastic piece 403 from falling off.

In one or more embodiments, an edge of the lever main body 401 opposite to the network interface card body 201 is defined as a second edge when the second bending portion is connected to the first shielding portion. A first limiting protrusion 4018 is formed on the second edge. A first limiting groove 1017 configured to accommodate the first limiting protrusion 4018 is formed in the housing 1. The first limiting groove 1017 can enter the first limiting protrusion 4018 when the second bending portion is connected to the first shielding portion, and a groove wall of the first limiting groove 1017 provide a support force in the deformation direction of the elastic piece 403 to the first limiting protrusion 4018, so as to protect a hinge shaft of the lever structure 4, and avoid the lever main body 401 from being biased by the elastic piece 403.

As a variable implementation, the first limiting protrusion is optionally formed on the housing, and the first limiting groove is optionally formed on the lever structure 4.

Figure 8:
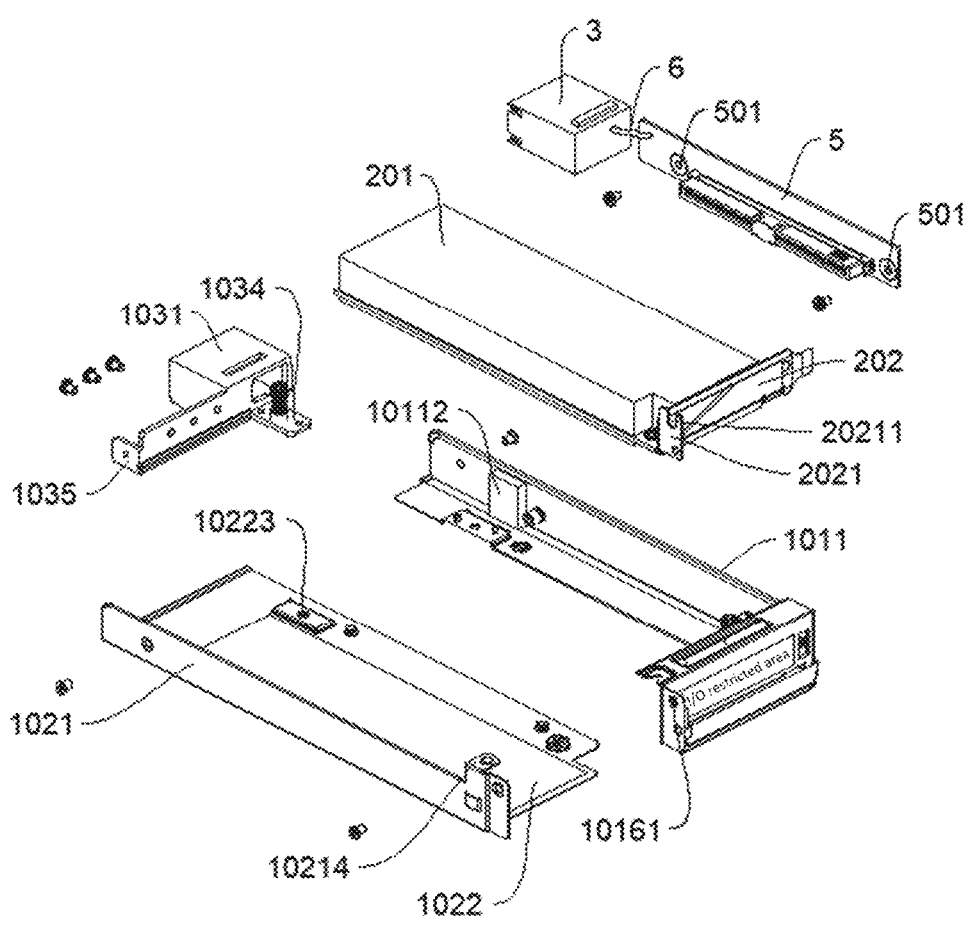
FIG. 8 is an exploded view of a bus module according to an embodiment of the present application.

In one or more embodiments, as shown in FIG. 8, the housing 1 includes a first bracket 101 and a second bracket 102. The first bracket 101 includes a first shielding wall 1011 and a second shielding wall 1012. The first shielding wall 1011 is connected to the second shielding wall 1012, and shields one side of the blocking piece 202 away from the network interface card body 201. A baffle plate 1016 is formed at one end of the second shielding wall 1012 away from the first shielding wall 1011. The baffle plate 1016 is bent toward one side away from the network interface card body 201. The second bracket 102 includes a third shielding wall 1021. The second bracket 102 is detachably connected to the first bracket 101. The bus network interface card 2 is detachably arranged on the second bracket 102. The third shielding wall 1021 is configured to shield one side of the bus network interface card 2 away from the third shielding wall 1021. The first bending portion 2021 is sandwiched between the baffle plate 1016 and the third shielding wall 1021.

Through such an arrangement, the first bracket 101 and the second bracket 102 can be connected with each other in a width direction of the bus network interface card 2, and the third shielding wall 1021 and the baffle plate 1016 can be sandwiched on the first bending portion 2021 from two sides of the first bending portion 2021, thereby limiting and protecting the first bending portion 2021 without occupying too much space.

Figure 9:
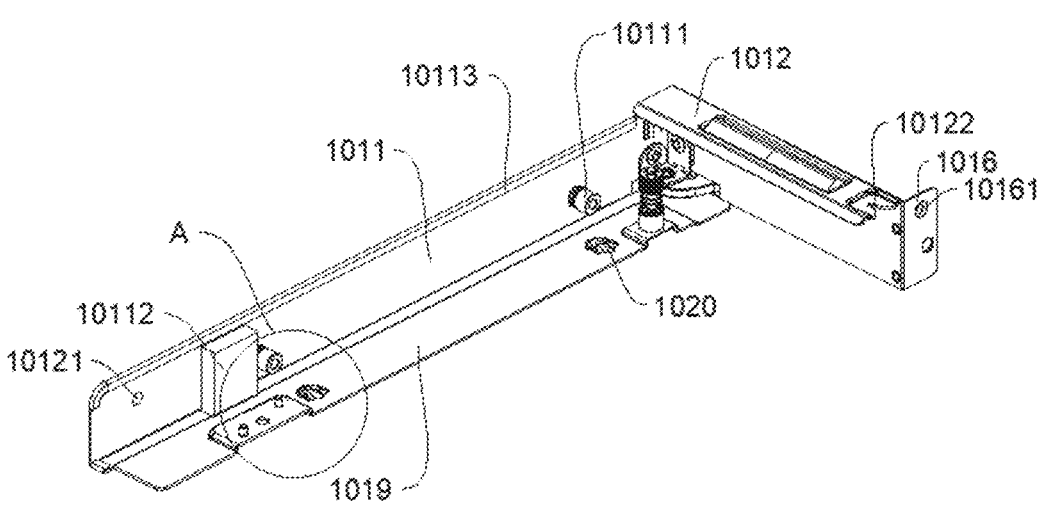
FIG. 9 is a three-dimensional diagram of a first bracket of a bus module according to an embodiment of the present application from another perspective.
Figure 10:
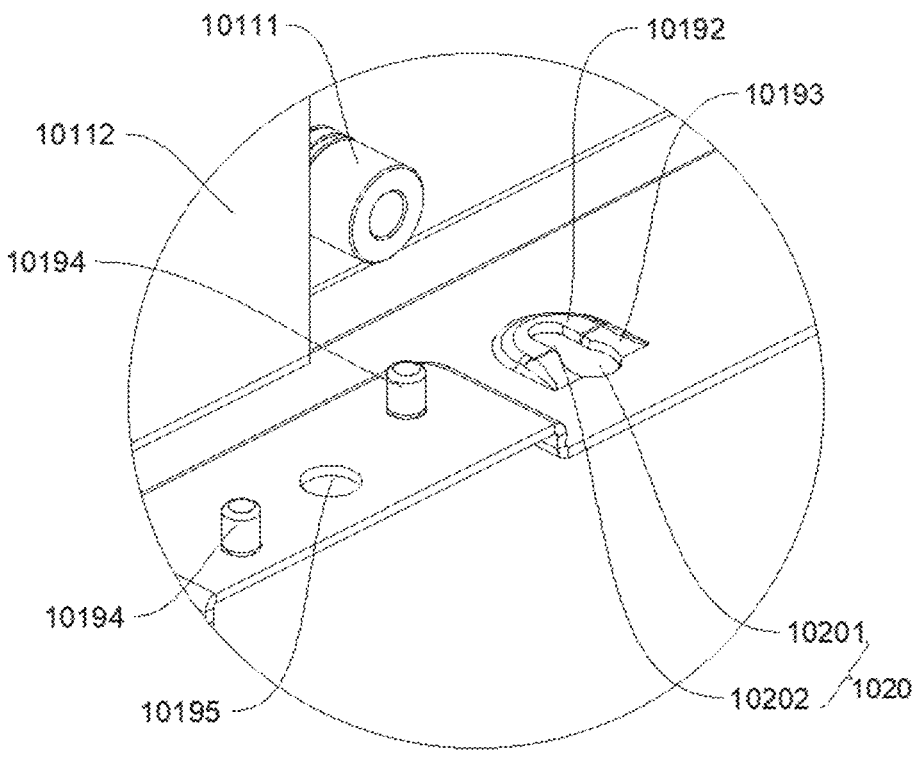
FIG. 10 is an enlarged view of A in FIG. 9.
Figure 11:
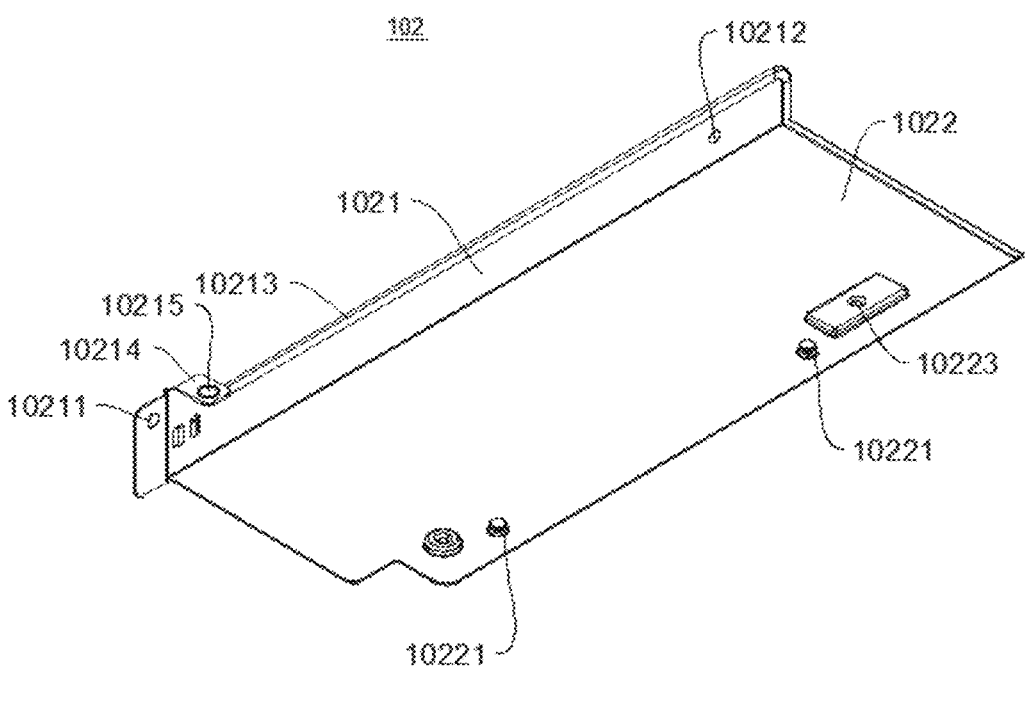
FIG. 11 is a second bracket of a bus module according to an embodiment of the present application.

In one or more embodiments, as shown in FIG. 9 to FIG. 11, a first connecting hole 10211, a second connecting hole 20211, and a third connecting hole 10161 are respectively formed in the third shielding wall 1021, the first bending portion 2021, and the baffle plate 1016. A first fastener is sequentially connected to the first connecting hole 10211, the second connecting hole 20211, and the third connecting hole 10161, and the sprouting structure 1018 is formed at the third connecting hole 10161. Therefore, the sprouting structure 1018 generated at a connection between the first fastener and the baffle plate 1016 can match the locking structure 402, so that the lever structure is connected to the baffle plate by fully using a structure of the housing 1. Therefore, the bus module is self-locked without increasing a quantity of components on the bus module, the quantity of the components required by the bus module can be reduced, an assembling process of the bus module is simplified, and reducing of space occupied by the bus module is facilitated.

The first fastener is preferably, but not limited to, a thumb screw, a captive screw, or the like.

In one or more embodiments, the second bracket 102 further includes a bottom support plate 1022 connected to the third shielding wall 1021. The bottom support plate 1022 extends in a direction close to the first shielding wall 1011. The first bracket 101 includes a first folded edge 1019 connected to the first shielding wall 1011, and the first folded edge 1019 is configured to fit the bottom support plate 1022. A fourth connecting hole and a fifth connecting hole 1020 are respectively formed in the bottom support plate 1022 and the first folded edge 1019, and a second fastener is sequentially connected to the fourth connecting hole and the fifth connecting hole 1020. Through such an arrangement, area at a connection between the first bracket 101 and the second bracket 102 can be increased, which helps to improve connecting strength of the first bracket 101 and the second bracket 102.

Preferably, a bump is formed on one side of the second shielding wall 1012 away from the bottom support plate 1022, and electromagnetic interference (EMI) gasket is adhered to the bump. An opening is formed in one end of the second bracket 102 away from the second connector 3, and an EMI elastic sheet is mounted at the opening, which can prevent internal components in the bus module from external interference. Preferably, an installation port is formed in one side of the second shielding wall 1012 away from the second connector 3, and an input/output (I/O) connector is arranged at the installation port.

As a variable implementation, the bottom support plate 1022 is optionally connected to the first shielding wall 1011 or the second shielding wall 1012.

As a variable implementation, the first bracket 101 and the second bracket 102 are optionally detachably connected with each other in a manner of riveting, clamping, and the like.

In one or more embodiments, as shown in FIG. 10, a limiting bump 10192 and a guide bump 10193 that protrude upward are formed on the first folded edge 1019. The guide bump 10193 is connected to the limiting bump 10192. A height of the guide bump 10193 that protrudes from the bottom support plate 1022 gradually increases toward the limiting bump 10192. The fourth connecting hole includes a first hole section 10201 and a second hole section 10202. The first hole section 10201 is formed on the guide bump 10193. The second hole section 10202 is formed on the limiting bump 10192. A hole diameter of the first hole section 10201 is greater than a hole diameter of the second hole section 10202. The first hole section 10201 is communicated with the second hole section 10202 to form a gourd-shaped hole. The second fastener is a push pin, one end of the push pin is connected to the fourth connecting hole, and the other end is detachably connected to the gourd-shaped hole.

Preferably, a hole diameter of the first hole section 10201 of the gourd-shaped hole is greater than or equal to an outside diameter of a handle portion of the push pin, so that the handle portion of the push pin can penetrate through. A hole diameter of the second hole section 10202 of the gourd-shaped hole is less than or equal to the outside diameter of the handle portion of the push pin, so that the push pin can be clamped on the first folded edge 1019.

Through such an arrangement, when the first bracket 101 needs to be connected to the second bracket 102, an operator can enable the push pin to penetrate through the first hole section 10201 of the gourd-shaped hole first, and then push the bottom support plate to the limiting bump 10192, so that the handle portion of the push pin can be clamped at the second hole section 10202 of the gourd-shaped hole, and a height of the guide bump 10193 that protrudes from the bottom support plate 1022 gradually increases. As push pin enters the second hole section 10202 along the first hole section 10201 of the gourd-shaped hole, and the bottom support plate can be tightly pressed onto a folded edge to complete pre-positioning of the first bracket 101 and the second bracket 102.

Preferably, the housing 1 further includes a first thumb screw. The first thumb screw is rotatably connected to the first folded edge 1019. A screw hole is correspondingly formed in the bottom support plate 1022, and the first thumb screw is in threaded connection with the screw hole. Through such an arrangement, the push pin can match the gourd-shaped hole, the guide bump 10193, and the limiting bump 10192 to pre-position the first bracket 101 and the second bracket 102. The first bracket 101 can be fixedly connected to the second bracket 102 through the first thumb screw, so that the first bracket 101 is connected to the second bracket 102 without using a tool such as a wrench or a screwdriver, which can simplify an assembling process of the bus module, and avoid a damage to the first bracket 101 or the second bracket 102 by the tool.

As a variable implementation, the second fastener is a screw.

Figure 12:
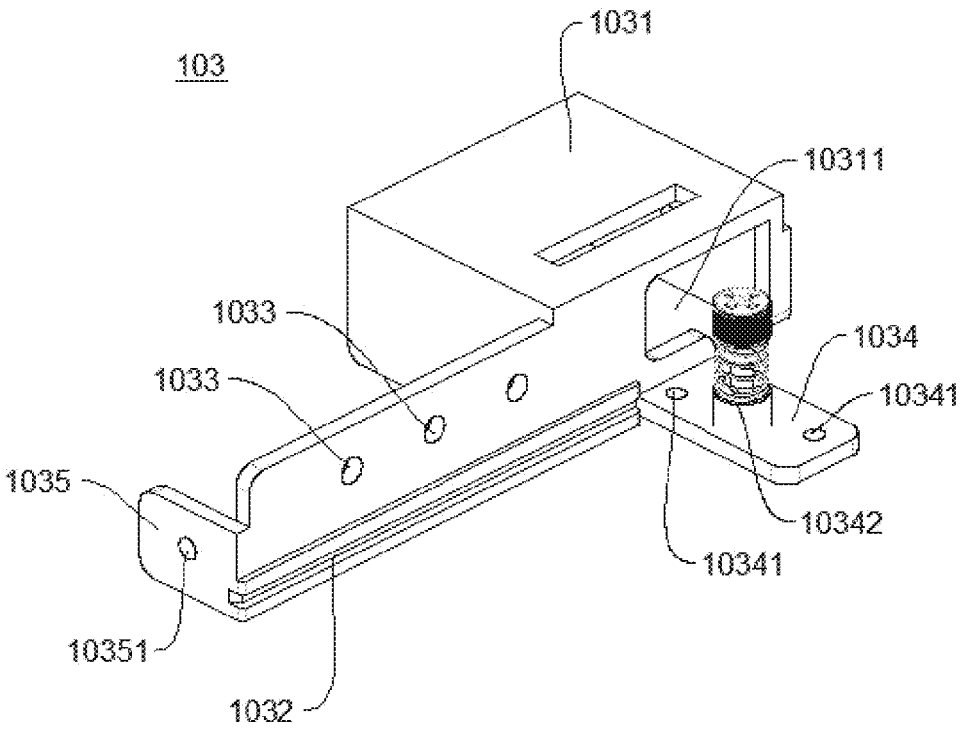
FIG. 12 is a tail bracket of a bus module according to an embodiment of the present application.
Figure 13:
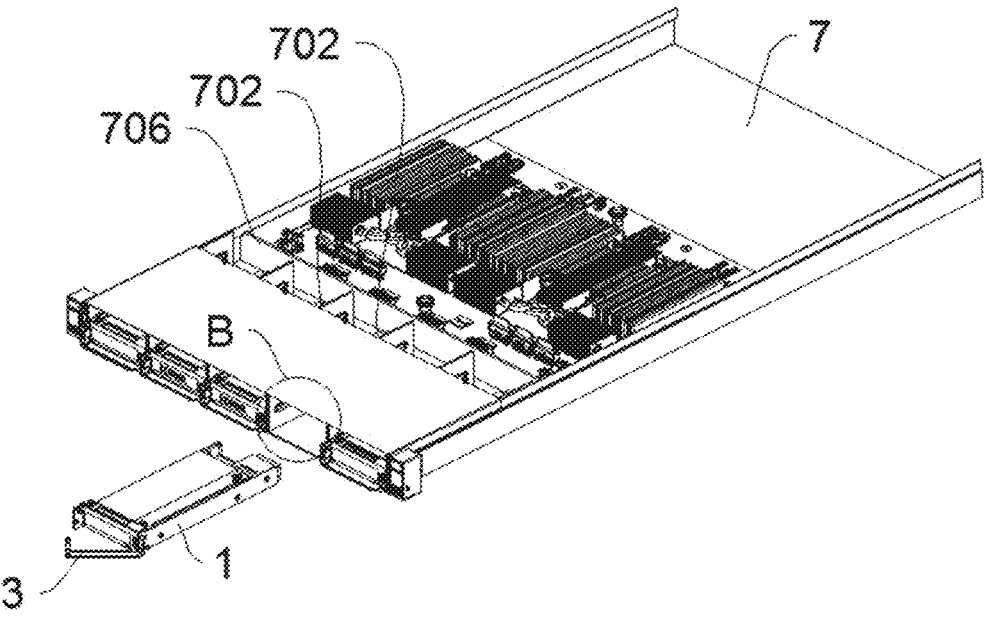
FIG. 13 is a server according to an embodiment of the present application.
Figure 14:
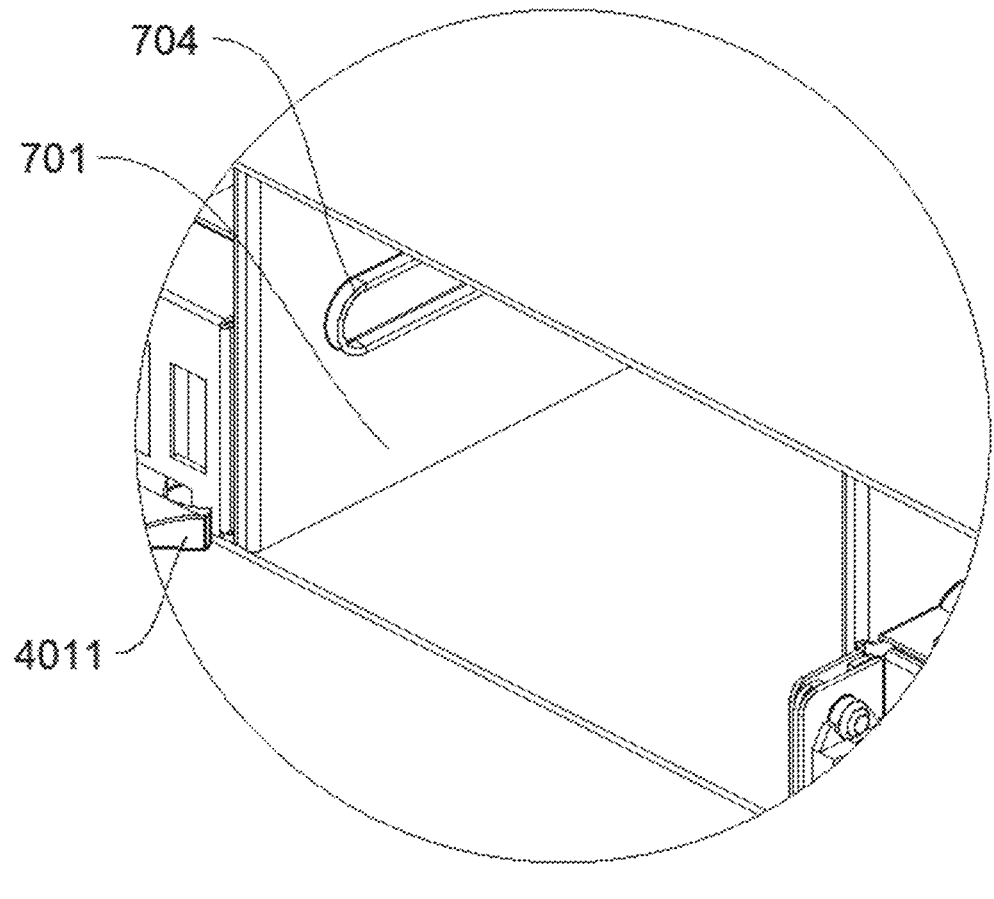
FIG. 14 is an enlarged view of B in FIG. 13.
Figure 15:
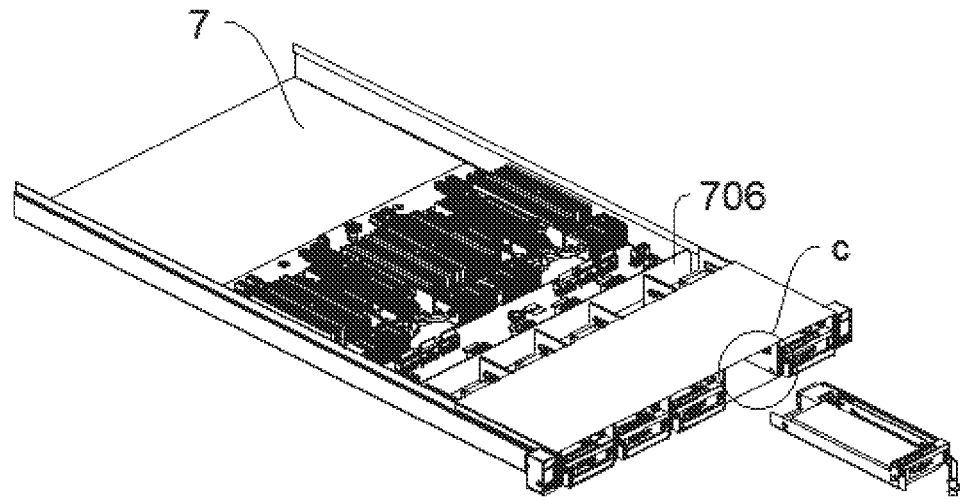
FIG. 15 is a three-dimensional diagram of a server according to an embodiment of the present application from another perspective.
Figure 16:
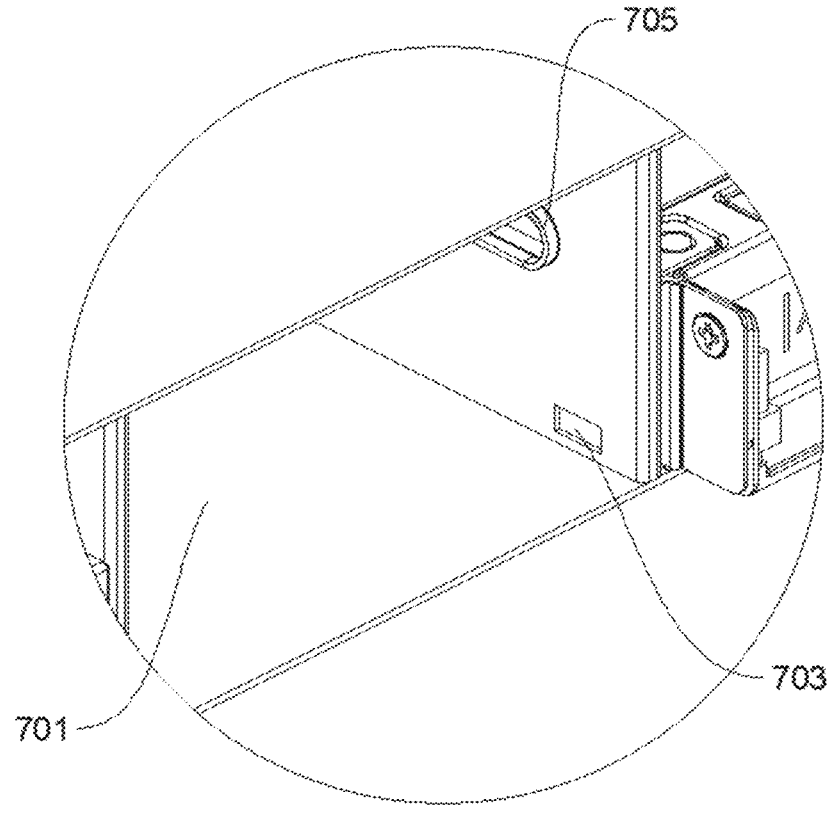
FIG. 16 is an enlarged view of C in FIG. 15.

In one or more embodiments, as shown in FIG. 12, the bus module further includes a tail bracket 103, connected to the first end, and detachably connected to both the first bracket 101 and the second bracket 102. The tail bracket 103 can protect a tail end of the bus network interface card 2, and enhance overall strength of the housing 1.

In one or more embodiments, a limiting housing 1031 is formed on the tail bracket 103. The second connector 3 is limited in the limiting housing 1031. The limiting housing 1031 can perform limiting protection on the second connector 3, and prevent the second connector 3 from displacing during plugging or unplugging the bus module.

As a variable implementation, the limiting housing 1031 is fixedly connected to the first bracket 101, and the second connector 3 is limited on the limiting housing 1031.

In one or more embodiments, the limiting housing 1031 covers the bottom support plate 1022. A limiting space is formed between the limiting housing 1031 and the bottom support plate 1022, and an avoidance port 10311 for the second connector 3 to penetrate through is formed in one side of the limiting housing 1031 close to the bottom support plate 1022. The operator can cover the tail bracket 103 from the upper part of the second connector 3 to second connector 3, and the second connector 3 can penetrate through the avoidance port 10311 to enter the limiting space. Compared with that the second connector 3 is installed in the limiting housing 1031 in a manner of plugging with the first connector 702, in this solution, the avoidance port 10311 for second connector 3 to penetrate through does not need to be formed between the limiting housing 1031 and the bus network interface card 2, so that a support force can be better provided when the second connector 3 is plugged with the first connector 702.

In one or more embodiments, a bus network interface card fixing groove 1032 is formed in one side of the tail bracket 103 toward the bus network interface card 2. A tail of the bus network interface card 2 can be clamped in the bus network interface card fixing groove 1032.

A sixth connecting hole 1033 is formed in the tail bracket 103, and a third fastener is connected to the bus network interface card 2 through the sixth connecting hole 1033, so that the bus network interface card 2 is fixedly connected to the tail bracket 103. The third fastener is preferably, but not limited to, a captive screw, or a thumb screw, or the like.

The tail bracket 103 further includes a bracket main body and a connecting plate 1034. The connecting plate 1034 is connected to one side of the bracket main body close to the bus network interface card 2 and covers the first folded edge 1019. A second limiting protrusion 10194 is formed on the first folded edge 1019. A second limiting groove 10341 is formed in the connecting plate 1034. The second limiting protrusion 10194 is limited in the second limiting groove 10341. A seventh connecting hole 10342, an eighth connecting hole 10195, and a ninth connecting hole 10223 are respectively formed in the connecting plate 1034, the first folded edge 1019, and the bottom support plate 1022, the housing further includes a second thumb screw, and the second thumb screw is sequentially connected to the seventh connecting hole 10342, the eighth connecting hole 10195, and the ninth connecting hole 10223.

Through such an arrangement, the second limiting protrusion 10194 can enter a third limiting groove when the tail bracket 103 is pressed onto the second connector 3, so as to pre-position the tail bracket 103 and the first folded edge 1019. Then, the operator can enable the second thumb screw to connected to the ninth connecting hole 10223 through the seventh connecting hole 10342 and the eighth connecting hole 10195, so that a tail fixing bracket, the first bracket 101, and the second bracket 102 are reliably connected without using a tool such as a wrench and a screwdriver.

Preferably, a positioning bump is formed on the first folded edge 1019. Both the second limiting protrusion 10194 and the eighth connecting hole 10195 are formed on the positioning bump. A matching bump is formed at a positioning corresponding to the positioning bump on the bottom support plate, and the ninth connecting hole 10223 is formed on the matching bump. The matching bump can match the positioning bump, and pre-position the bottom support plate and the first folded edge 1019.

As a variable implementation, a second limiting groove 10341 is formed in the first folded edge 1019, and the second limiting protrusion 10194 is formed on the connecting plate 1034.

A second folded edge 1035 is formed on one side of the tail bracket 103 close to the third shielding wall 1021. The second folded edge 1035 is configured to be in contact with the third shielding wall 1021. A tenth connecting hole 10212 and an eleventh connecting hole 10351 are respectively formed in the third shielding wall 1021 and the second folded edge 1035. A fourth fastener is sequentially connected to the tenth connecting hole 10212 and the eleventh connecting hole 10351. The fourth fastener is preferably, but not limited to, a captive screw, or a thumb screw, or the like.

As a variable implementation, the tail bracket 103 is optionally detachably connected to the third shielding wall 1021 in a manner of clamping, riveting, and the like.

A twelfth connecting hole 10121 and a thirteenth connecting hole are respectively formed in the first shielding wall 1011 and the tail bracket 103, and a fifth fastener is sequentially connected to the twelfth connecting hole 10121 and the thirteenth connecting hole 10321.

The fifth fastener is preferably, but not limited to, a captive screw, or a thumb screw, or the like.

As a variable implementation, the tail bracket 103 is optionally detachably connected to the first shielding wall 1011 in a manner of clamping, riveting, and the like.

In one or more embodiments, the bus module further includes an adapter card 5 and a conducting wire 6. The adapter card 5 is connected to the first shielding wall 1011. A wire passing hole 10312 is formed in a side wall of the limiting housing 1031. One end of the conducting wire 6 is connected to the second connector 3, and the other end of the conducting wire 6 penetrates through the wire passing hole 10312 to the adapter card 5. The wire passing hole 10312 is preferably provided in a side wall of one side of the limiting housing 1031 close to the adapter card 5, which can prevent the limiting housing 1031 from interfering with the conducting wire 6 during installing the limiting housing 1031 in the second connector 3. The conducting wire 6 is preferably a bonding wire.

The adapter card 5 is preferably a Riser card, is a function expansion card or an adapter card 5 plugged into a PCI-E interface. An interface is formed in one side of the adapter card 5 close to the bus network interface card 2. A card edge connector is formed on one side of the bus network interface card 2 close to the adapter card 5. The edge connector on a side of the bus network interface card 2 can be plugged with the interface of the adapter card 5.

As a variable implementation, the second connector 3 is preferably directly connected to the adapter card 5.

The applicant found that a signal needs to be transmitted to the second connector through a long path on the adapter card if the second connector is directly connected to the adapter card, resulting that the signal cannot meet a requirement. In this embodiment, the second connector 3 is configured to be connected to the adapter card 5 through the conducting wire 6, so that the conducting wire 6 can partially replace the adapter card 5 to transmit the signal, a length of the adapter card 5 can be configured to be relatively short, and the bus module of this embodiment has a relatively good signal transmission effect because a transmission effect of the signal in the conducting wire 6 is better than a transmission effect of the adapter card 5.

In one or more embodiments, a plurality of connecting columns 10111 are spaced on the first shielding wall 1011. A plurality of fourteenth connecting holes 501 corresponding to the connecting columns 10111 are formed in the adapter card 5. Sixth fasteners are connected to the connecting columns 10111 through the fourteenth connecting holes 501. A cushion pad 10112 is arranged on one side of the first shielding wall 1011 close to the second connector 3. The cushion pad 10112 is configured to be in contact with the adapter card 5. Through such an arrangement, the cushion pad 10112 can be in contact between a suspended end of the adapter card 5 and the first shielding wall 1011, which can cushion and support the adapter card 5, and avoid the adapter card 5 from being damaged during assembling. The cushion pad 10112 is preferably, but not limited to, a rubber pad, a foam pad, or the like.

In one or more embodiments, a first sliding rail 704 and a second sliding rail are respectively formed on slot walls on two sides of the slot 701, a first guide portion and a second guide portion are respectively formed on two opposite sides of the housing 1, and the first guide portion and the second guide portion are respectively in sliding fit with the first sliding rail 704 and the second sliding rail. Through such an arrangement, the first sliding rail 704 and the second sliding rail 705 can constrain a movement path of the bus module, which ensures that the second connector 3 can be accurately butted with the first connector 702, and avoid damage to the bus module or the slot 701 of the case 7 caused by misalignment of the second connector 3 and the first connector 702.

Preferably, a height of the first sliding rail 704 is inconsistent with that of the second sliding rail 705, which can prevent an error, and avoid assembling a module reversely to damage a device.

In one or more embodiments, as shown in FIG. 13 to FIG. 16, the first guide portion includes a first guide folded edge 10213 formed on an edge of the third shielding wall 1021 away from the bottom support plate 1022 when the bottom support plate 1022 is located on a bottom surface. The first guide folded edge 10213 is formed by bending the edge of the third shielding wall 1021 away from the bottom support plate 1022 to an inner side of the housing 1. Through such an arrangement, the first guide folded edge 10213 can be in sliding fit with a first sliding rail, and can prevent a sharp edge of the third shielding wall 1021 from scratching an operator or a side wall of the slot 701.

As a variable implementation, the first guide portion includes a strip-shaped groove formed in the third shielding wall 1021. The strip-shaped groove extends in a direction in which a bus module is plugged with the slot 701, and is configured to be in sliding fit with the first sliding rail.

The second guide portion includes a second guide folded edge 10113 formed on an edge of the first shielding wall 1011 away from the bottom support plate 1022 when the bottom support plate 1022 is located on a bottom surface. The second guide folded edge 10113 is formed by inward bending the edge of the first shielding wall 1011 away from the bottom support plate 1022. Through such an arrangement, the second guide folded edge 10113 can be in sliding fit with a second sliding rail, and can prevent a sharp edge of the first shielding wall 1011 from scratching an operator or a side wall of the slot 701. As a variable implementation, the second guide portion includes a strip-shaped groove formed in the first shielding wall 1011. The strip-shaped groove extends in a direction in which a bus module is plugged with the slot 701, and is configured to be in sliding fit with the second sliding rail.

In one or more embodiments, a stop edge 10214 folded toward the first shielding wall 1011 is formed on the third shielding wall 1021, and the stop edge 10214 is configured to be in contact with an end portion of the first sliding rail. The stop edge 10214 can be in contact with an end portion of the first sliding rail and prevent the bus module from continue moving after the first connector 3 is plugged with the first connector 702, so as to prevent the first connector 702 or the second connector 3 from being damaged.

In one or more embodiments, the stop edge 10214 is configured to cover a top of the second shielding wall 1012. A fifteenth connecting hole 10215 and a sixteenth connecting hole 10122 are respectively formed in the stop edge 10214 and the second shielding wall 1012. A seventh fastener is sequentially connected to the fifteenth connecting hole 10215 and the sixteenth connecting hole 10122.

Through such an arrangement, the stop edge 10214 can limit a plugging depth of the bus module, and can be configured to be connected to the second shielding wall 1012, thereby improving overall strength of the bus module.

As a variable implementation, the stop edge 10214 is optionally detachably connected to the second shielding wall 1012 in a manner of clamping, riveting, and the like.

Figure 17:
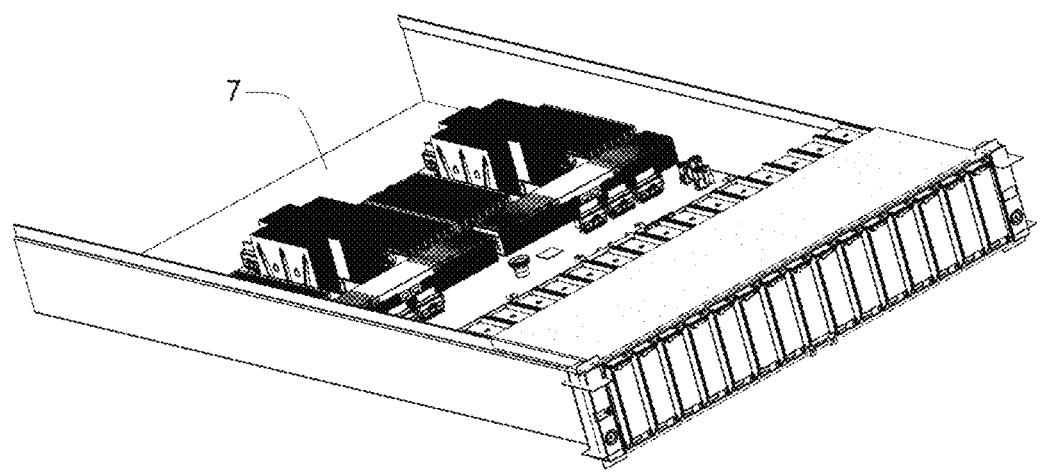
FIG. 17 is a server according to some other embodiments of the present application.
Figure 18:
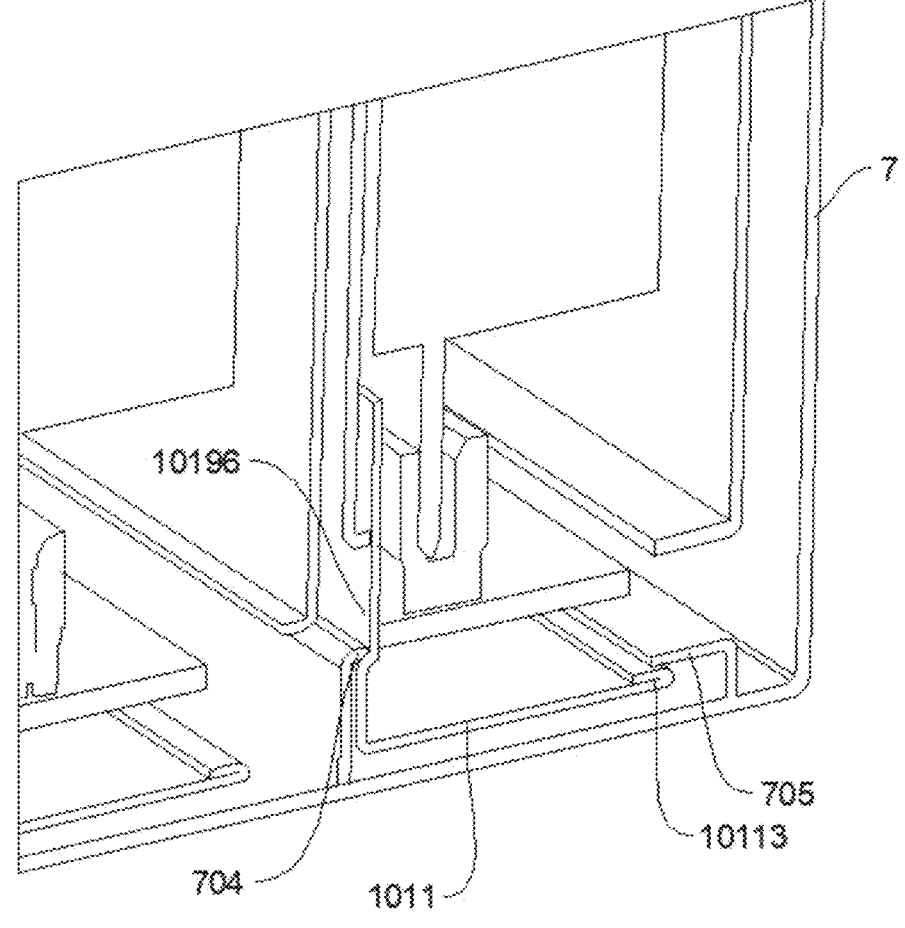
FIG. 18 is an enlarged view of a notch of a slot of the server shown in FIG. 17.

In one or more embodiments, as shown in FIG. 17 and FIG. 18, the first guide portion includes a guide groove 10196 formed on the first folded edge 1019 when the first shielding wall 1011 is located at a bottom.

The second guide portion includes a second guide folded edge 10114 formed on an edge of the first shielding wall 1011 away from the bottom support plate 1022 when the first shielding wall 1011 is located at a bottom.

Through such an arrangement, the bus module can not only match a slot 701 extending in a vertical direction, but also match a slot 701 extending in a horizontal direction, so that an application range of the bus module is expanded, and the bus module can be applied to different cases 7. In addition, the second folded edge 1035 on the first shielding wall 1011 can not only match the second sliding rail of the slot 701 extending in the horizontal direction, but also match the second sliding rail of the slot 701 extending in the vertical direction, so that functions are diversified, and reducing of a quantity of components of the bus module is facilitated.

Next, a mounting manner of a bus module according to an embodiment of the present application is described.

First, an adapter card 5 is connected to a second connector 3 through a conducting wire 6, and then, a sixth fastener penetrates through a fourteenth connecting hole 501 and a connecting column 10111 to fixedly connect the adapter card 5 to a first bracket 101. An edge connector of the bus module is plugged into an interface of the adapter card 5.

Then, a second bracket 102 is connected to the first bracket 101, and a third shielding wall 1021 and a baffle plate 1016 respectively cover two sides of a first bending portion 2021. The second bracket 102 is fixedly connected to the first bracket 101 by using a first thumb screw. A bus network interface card 2 is fixedly connected to the first bracket 101 by using a fastener.

Then, a tail bracket 103 is installed onto the second connector 3 from top to bottom. At this moment, a third limiting protrusion can penetrate through a third limiting groove to pre-position the tail bracket 103. An operator can fixedly connect the tail bracket 103, a first folded edge 1019, and a bottom support plate 1022 through a second thumb screw. One end of the bus network interface card 2 close to the second connector 3 can be clamped in a bus network interface card fixing groove 1032, and a third fastener is connected to the bus network interface card 2 through a sixth connecting hole 1033, so that the bus network interface card 2 is fixedly connected to the tail bracket 103. A fourth fastener sequentially penetrates through a tenth connecting hole 10212 and an eleventh connecting hole 10351. A fifth fastener is connected to a thirteenth connecting hole 10321 through a twelfth connecting hole 10121, so that the tail bracket 103 is fixedly connected to the first bracket 101 and the second bracket 102.

Finally, a locking sleeve 4021 is pressed to release a locking connection between the locking sleeve 4021 and a sprouting structure 1018. A handle is rotated in a direction away from a housing 1, and a second abutting protrusion 4012 can enter the housing 1, so that the bus module is allowed to be plugged into a slot 701 of a case 7. A first sliding rail and a second sliding rail on slot walls on two sides of the slot 701 match a first guide portion and a second guide portion on two sides of the bus module to guide the second connector 3 to a first connector 702. After the second connector 3 is in contact with the first connector 702, the operator rotates the lever structure 4 to a direction close to the housing 1. The second abutting protrusion 4012 can match a contact slot 703. The bus module is pushed into the slot 701 to assist in plugging between the second connector 3 and the first connector 702. A locking gap in the locking sleeve 4021 can be locked with the sprouting structure 1018, and the second abutting protrusion 4012 is locked in the contact slot 703. At this moment, the second abutting protrusion 4012 can match a slot wall of the contact slot 703 to prevent the bus module from being pulled out from the slot 701.

According to an embodiment of the present application, in another aspect, a sever is further provided, including a case 7 and a bus module. A slot 701 is formed in one side of the case 7. The bus module is a bus module involved in the first aspect of the present application, where the bus module is configured to be plugged into the slot 701.

The server according to the second aspect of the present application includes or uses the bus module according to the first aspect of the present application, so that the server has beneficial effects of the bus module, and can overcome defects that a relatively high plugging and unplugging force is required for disassembling and assembling the bus module, the disassembling and assembling processes are laborious, and labor intensity of the operator is improved. The lever structure 4 occupies a small space and is not prone to touching by mistake to affect stability of the bus module.

In one or more embodiments, the case 7 further includes a back plate 706, detachably arranged in the case 7, and arranged opposite to the slot 701, wherein a second connector 3 is formed on the back plate 706, and the second connector 3 is configured to be plugged into a first connector 702.

Through such an arrangement, an operator only needs to replace the back plate 706 to enable a slot position of the case 7 to be adapted to another module, for example, a hard disc module, which improves the modularity and reuse rate of the case 7, and helps to reduce costs of the case 7.

Although the embodiments of the present application have been described in combination with the accompanying drawings, a person of ordinary skill in the art may make various modifications and variations without departing from the spirit and scope of the present application, and such modifications and variations fall within the scope defined by the appended claims.

What is claimed is:

1. A bus module, for plugging into a slot of a case, wherein a first connector is arranged in the slot, and the bus module comprises:

a housing, having a first end and a second end opposite the first end;

a second connector, connected to the first end of the housing, and configured to be plugged with the first connector;

a bus network interface card, arranged in the housing, wherein the bus network interface card comprises a network interface card body and a blocking piece, the blocking piece is connected to one end of the network interface card body away from the second connector, a first bending portion is formed at one end of the blocking piece, the first bending portion extends in a direction away from the network interface card body, and a first shielding portion arranged around the first bending portion is formed at a position on the housing corresponding to the first bending portion; and a lever structure, comprising a hinge end, an operating end, and a second bending portion, wherein the hinge end is hinged to one side of the second end away from the first bending portion, the second bending portion is connected to the operating end, the second bending portion is configured to be in contact with the first shielding portion and is detachably connected to the first shielding portion;

wherein the hinge end is provided with a first abutting protrusion and a second abutting protrusion, wherein the first abutting protrusion is configured to contact and press a notch of the slot when the operating end rotates in a direction away from the housing, so as to remove the bus module from the slot, and wherein the second abutting protrusion is configured to engage a contact slot formed in a slot wall of the slot when the second bending portion is connected to the first shielding portion, so as to prevent the bus module from being removed from the slot, and to disengage the contact slot when the operating end rotates in the direction away from the housing, so as to allow the bus module to be removed from the slot.

2. The bus module according to claim 1, wherein a connecting port is formed in one side of the second end hinged to the lever structure, the hinge end penetrates through the connecting port and is hinged to an interior of the housing, and the second abutting protrusion penetrates through the connecting port and is plugged into the contact slot when the second bending portion is connected to the first shielding portion.

3. The bus module according to claim 2, wherein the connecting port comprises a first connecting port and a second connecting port, the first connecting port and the second connecting port are respectively provided in two adjacent side walls of the second end, a connecting portion is formed between the first connecting port and the second connecting port, an avoidance opening is formed between the first abutting protrusion and the second abutting protrusion, and the connecting portion penetrates through the avoidance opening.

4. The bus module according to claim 1, wherein the lever structure comprises:

a lever main body, comprising the hinge end, the operating end, and the second bending portion;

a locking structure, movably connected to the second bending portion, wherein the locking structure has a locking position locked and connected to the second end and an unlocking position separated from the second end of the housing; and an elastic piece, connected between the locking structure and the second bending portion.

5. The bus module according to claim 4, wherein a sprouting structure protrudes from the first shielding portion, and a locking gap configured to be locked and connected to the sprouting structure is formed in the locking structure.

6. The bus module according to claim 5, wherein the locking structure comprises:

a locking sleeve, provided with the locking gap thereon; and a plug-in port, formed in the locking sleeve, wherein an edge that faces the bus network interface card is defined as a first edge when the locking structure is locked and connected to the sprouting structure, the plug-in port is formed at the first edge, and the second bending portion is configured to extend into the plug-in port.

7. The bus module according to claim 6, wherein the locking sleeve is connected to the second bending portion through a guide structure, and the guide structure is configured to guide the locking sleeve to slide in a deformation direction of the elastic piece.

8. The bus module according to claim 7, wherein the guide structure comprises:

a chute, formed in the second bending portion; and elastic snap hooks, formed on the locking sleeve and located on two sides of the plug-in port, wherein the elastic snap hooks are configured to extend into the chute and slide along the chute.

9. The bus module according to claim 8, wherein two ends of each of the elastic snap hooks are respectively configured to be in contact with corresponding chute walls of the chute.

10. The bus module according to claim 6, wherein the elastic piece is a spring, and the locking structure further comprises:

an accommodating blind hole, formed in the locking sleeve, wherein the accommodating blind hole is located on one side of the locking sleeve away from the plug-in port, a limiting stud is arranged on the second bending portion, the limiting stud is arranged in the accommodating blind hole in a sliding manner, one end of the spring is sleeved over the limiting stud, and a second end of the spring is in contact with a hole wall of the accommodating blind hole.

11. The bus module according to claim 10, wherein a step portion is formed on the second bending portion, the limiting stud is arranged on the step portion, a cross-sectional area of the step portion is greater than a cross-sectional area of the limiting stud, the locking sleeve further comprises: an accommodating cavity, connected below the accommodating blind hole and in communication with the plug-in port, and the accommodating cavity is configured to accommodate the step portion.

12. The bus module according to claim 5, wherein an edge of the lever main body opposite to the network interface card body is defined as a second edge when the second bending portion is connected to the first shielding portion, a first limiting protrusion is formed on the second edge, and a first limiting groove configured to accommodate the first limiting protrusion is formed in the housing.

13. The bus module according to claim 5, wherein the housing comprises: a first bracket, comprising a first shielding wall and a second shielding wall, wherein the second shielding wall is connected to the first shielding wall and shields one side of the blocking piece away from the network interface card body, a baffle plate is formed at one end of the second shielding wall away from the first shielding wall, and the baffle plate is bent toward one side away from the network interface card body; and a second bracket, comprising a third shielding wall, wherein the second bracket is detachably connected to the first bracket, the bus network interface card is detachably arranged on the second bracket, the third shielding wall is configured to shield one side of the bus network interface card away from the third shielding wall, and the first bending portion is sandwiched between the baffle plate and the third shielding wall.

14. The bus module according to claim 13, wherein a first connecting hole, a second connecting hole, and a third connecting hole are respectively formed in the third shielding wall, the first bending portion, and the baffle plate; a first fastener is sequentially connected to the first connecting hole, the second connecting hole, and the third connecting hole; and the sprouting structure is formed at the third connecting hole.

15. The bus module according to claim 13, wherein the second bracket further comprises a bottom support plate connected to the third shielding wall, the bottom support plate extends in a direction close to the first shielding wall, the first bracket comprises a first folded edge connected to the first shielding wall, the first folded edge is configured to fit the bottom support plate, a fourth connecting hole and a fifth connecting hole are respectively formed in the bottom support plate and the first folded edge, and a second fastener is sequentially connected to the fourth connecting hole and the fifth connecting hole.

16. The bus module according to claim 15, further comprising a tail bracket, connected to the first end, and detachably connected to both the first bracket and the second bracket.

17. A server, comprising:

a case, wherein a slot is formed in one side of the case; and a bus module configured to be plugged into the slot, comprising:

a housing, having a first end and a second end opposite the first end;

a second connector, connected to the first end of the housing, and configured to be plugged with a first connector arranged in the slot;

a bus network interface card, arranged in the housing, wherein the bus network interface card comprises a network interface card body and a blocking piece, the blocking piece is connected to one end of the network interface card body away from the second connector, a first bending portion is formed at one end of the blocking piece, the first bending portion extends in a direction away from the network interface card body, and a first shielding portion arranged around the first bending portion is formed at a position on the housing corresponding to the first bending portion; and a lever structure, comprising a hinge end, an operating end, and a second bending portion, wherein the hinge end is hinged to one side of the second end away from the first bending portion, the second bending portion is connected to the operating end, the second bending portion is configured to be in contact with the first shielding portion and is detachably connected to the first shielding portion;

wherein the hinge end is provided with a first abutting protrusion and a second abutting protrusion, wherein the first abutting protrusion is configured to contact and press a notch of the slot when the operating end rotates in a direction away from the housing, so as to remove the bus module from the slot, and wherein the second abutting protrusion is configured to engage a contact slot formed in a slot wall of the slot when the second bending portion is connected to the first shielding portion, so as to prevent the bus module from being removed from the slot, and to disengage the contact slot when the operating end rotates in the direction away from the housing, so as to allow the bus module to be removed from the slot.

18. The server according to claim 17, further comprising:
a back plate, detachably arranged in the case, and arranged opposite to the notch of the slot, wherein the second connector is formed on the back plate.

\*    \*    \*    \*    \*